United States Patent Office 2,908,472
Patented Oct. 13, 1959

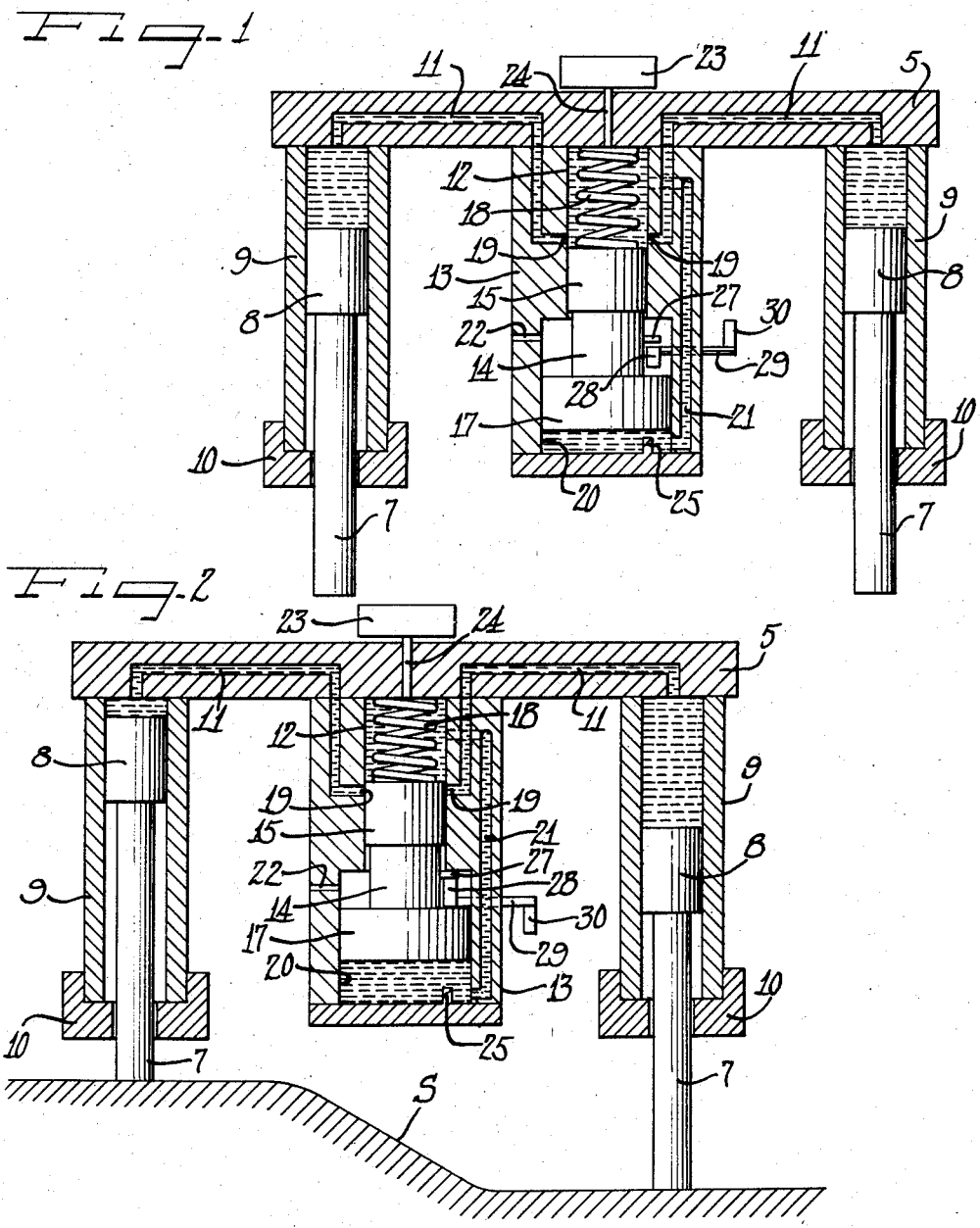

2,908,472
AUTOMATIC COMPENSATING DEVICE
Frederick W. McDonald, Elmhurst, Ill.

Application October 7, 1954, Serial No. 460,939

5 Claims. (Cl. 248—346)

The present invention relates to novel means for compensating for variable relative disposition of related extensible members which in operation must be maintained in relatively fixed positions.

There are numerous instances in the practical arts where two or more legs, pistons, arms, feelers, supports, and the like, must be adjustably related in order to accommodate contoured surfaces, different elevations, variable or offset relationships, slopes, rough terrain, etc. Among specific examples where it is desirable or necessary for an operating mechanism or body to be disposed in a predetermined attitude for operation despite variable environmental conditions may be mentioned aircraft in which the landing gears must be reasonably adjustable to uneven terrain and more particularly applicable to helicopter type aircraft not dependent upon smooth runways, gun carriages, portable platforms, supporting cradles such as drydocks, engine block repair cradles, multi-arm jacks, and the like.

The attainment of properly compensated adjustment of the plurality of supporting members of such apparatus has presented a substantial problem. It is to the solving of this general problem that the present invention is directed.

It is accordingly an important object of the present invention to provide a novel device for automatically compensating for variable relative positioning of relatively adjustable cooperating supporting or position determining members.

Another object of the present invention is to provide means for effecting automatic self-adjustment of a plurality of operationally rigid but adjustably relatively movable members.

A further object of the invention is to provide novel hydraulic control means for relatively movably adjustable members which must be maintained operationally in fixed relation.

Still another object of the invention is to provide novel means whereby reciprocably adjustable cooperative members are automatically relatively adjustable conformable to variable surface conditions encountered in use and are then maintained in fixed relationship after finding the ultimate operational aspect in any given situation for which the apparatus is intended.

Yet another object of the invention is to provide an automatic compensating device of wide adaptability for many practical applications in the practical arts.

Other objects, features and advantages of the present invention will be readily apparent from the following detailed description of an exemplary embodiment thereof taken in conjunction with the accompanying drawing, in which:

Figure 1 is a schematic sectional view, partially in elevation, of an automatic compensating device embodying the principles of the present invention;

Figure 2 is a similar schematic sectional elevational view of the device showing the same in an operative attitude with respect to a supporting surface.

It will be understood that the device as shown in the drawing may be used in the position shown with the legs or arms thereof projecting downwardly, with the legs or arms directed upwardly, or with the legs or arms directed toward one side. In the illustrated embodiment, a body member 5 has reciprocably relatively adjustable projecting engagement members 7, in the present instance comprising elongated plungers having elongated working piston heads 8 thereon of somewhat larger diameter and reciprocable within appropriate elongated working cylinders 9 fixedly carried by the body 5. Respective closure caps 10 may be provided on the ends of the cylinders 9 from which the plunger members 7 project. While two of the plungers 7 are shown in the drawing, it will be appreciated that the device may have as many more of the plungers 7 as desired, such as three for a tripod arrangement, four for a quadripod arrangement, etc.

Means are provided for connecting the plungers 7 for compensated relative reciprocation. That is, as one of the plungers retracts the companion plunger or plungers protract to an equal total extent. Herein such means comprise a hydraulic system wherein hydraulic fluid fills the respective cylinders 9 between the heads of the pistons 8 and the body 5 and communication between the hydraulically filled end portions of the cylinders 9 is effected through respective fluid ducts, conduits or passages 11 and a fluid chamber 12 provided in a master cylinder 13. Thus, as fluid is displaced from one of the cylinders 9, it is moved through the passages 11 and the fluid chamber 12 to the remaining cylinder or cylinders 9. Thereby the hydraulic fluid displaced by any one of the pistons 8 and conducted to the remaining piston or cylinders effects protractional movement of the other pistons and thus the plungers associated therewith. By way of example, in Figure 1 all of the plungers 7, in this instance comprising legs for the body 5, are shown as equally protracted with their outer ends in a common horizontal plane parallel with the top plane of the body 5. In contrast, in Figure 2, while the body 5 remains with its upper surface in a horizontal plane, the leg plungers 7 are disposed with their ends at respectively different elevations upon an irregular surface S. Hence, one of the leg plungers 7 is substantially retracted while the other of the leg plungers 7 is equally protracted to compensate for the irregularity of the surface S, and it will be noted that the hydraulic fluid which has been displaced from the cylinder 9 of the retracted plunger leg has been received in the cylinder 9 of the protracted plunger leg.

After the plungers 7 have assumed their relatively compensated positions, they are rigidly locked in such positions whereby the body 5 will be supported in the preferred attitude, as for example, horizontal, as shown. To this end, a master or locking piston 14 is provided which is reciprocably mounted within the master cylinder 13. One end portion of the master cylinder 14 is in the form of a piston head 15 which is of substantially smaller diameter than an opposite end piston head 17 so as to afford a differential pressure relationship at the opposite end of the master piston.

The smaller diameter head 15 of the master piston is reciprocable within an extension of the chamber 12 and is normally biased by means such as a compression spring 18 into a protracted relation to the fluid filled portion of the chamber 12 to clear respective ports 19 through which the plunger equalizing passages 11 communicate with the chamber 12 and which ports are disposed in relatively spaced relation but transverse alignment longitudinally of the chamber 12.

While the small diameter piston head 15 is normally maintained by the spring 18 in a position just clear of the ports 19 so as to leave the ports free for unimpeded equalizing flow of hydraulic fluid between the cylinders 9, as an incident to relative reciprocal movements of the plungers 7 and the piston 8 thereof, the construction and relationship within the master cylinder 13 is such that promptly upon development of coincident relatively opposed thrust load or pressure between the piston supporting structure or body 5 and all of the several thrust members or plungers 7, shifting of the master piston 14 in opposition to the biasing spring 18 occurs by hydraulic fluid action to move the piston head 15 into closing or blocking relation to the ports 19 to thereby effect hydraulic locking of all of the plungers 7 in their self-adjusted relation, as shown in Figure 2. This is accomplished by having the larger diameter piston head 17 reciprocably operable in a correspondingly enlarged diameter cylinder chamber 20, providing a low pressure chamber as compared to the higher pressure chamber 12 and communicating with the chamber 12 through a duct, conduit or passage 21. Thus, when pressure upon the outer ends of the plungers 7 becomes equalized, so that displacement of the hydraulic fluid between the cylinders 9 is precluded, displacement of fluid takes place from the chamber 12 through the passage 21 to the chamber 20 to the extent that the piston 14 is shifted into port blocking relation of the piston head 15 to the ports 19, whereupon the hydraulic system becomes locked as long as the pressure on the outer ends of the plungers 7 remains constant. Such pressure may be a result of the weight of the body 5, or load or pressure imposed thereon, or it may be pressure or load imposed upon the outer ends of the plungers 7 toward the body 5. In the locked condition of the hydraulic system, the body 5 and the plungers 7 will remain rigidly in the relative positions assumed at the moment the system became locked.

When pressure or load is removed from the outer end of any one or more of the plungers 7, thus relieving hydraulic pressure in its cylinder 9, or the supporting body 5 is backed off, as the case may be, there is sufficient hydraulic leakage from the cylinder 12 into the barely closed port 19 connecting the associated passage 11 to the relieved cylinder to effect a pressure relief in the chamber 12. This is reflected through the passage 21 in the chamber 20 so that the biasing spring 18 will act to depress or shift the master cylinder 14 toward inactive position wherein the ports 19 are open for free fluid displacement and until a compensated loading relationship has again been attained wherein pressure is exerted against the outer ends of all of the plungers 7.

It will thus be apparent that locking of the hydraulic system is accomplished automatically as an incident to attainment of the compensated relation of the several plungers 7. Unlocking and readjustment of the device also occurs automatically when the pressure is relieved from any one or more of the actuating members or plungers 7.

In order to avoid any pressure block between the small diameter piston head 15 and the large diameter piston head 17, the chamber portion of the master cylinder 13 therebetween is vented to atmosphere by a breather port 22.

Since a slight vacuum condition may be created in the high pressure chamber 12 of the master cylinder before the ports 19 are uncovered during unlocking of the hydraulic system, it may be desirable to provide a supplementary or auxiliary means or booster means to assist the spring 18 in shifting the master cylinder 14 toward the unlocked relationship. To this end a small air bell or air pressure chamber 23 may be provided having a limited passage 24 communicating with the chamber 12 at the end thereof toward which the static end of the biasing spring 18 thrusts.

In order to prevent overrunning of the piston head 17 into blocking relation to the mouth of the passage 21 in the chamber 20, a stop 25 is preferably provided.

By preference, a stop 27 is provided on the master piston 14 to limit movement of the piston head 15 into blocking relation to the ports 19. By action of the stop 27 bare closing of the ports 19 by the piston head is assured so that quick release on drop of pressure in any of the cylinders 9 will result.

Where a safety latch or lock is desired to preclude release of the master piston from the hydraulic lock position thereof, an expedient such as shown comprising a cam member 28 cooperable with the stop 27 may be employed. The locking cam or lug 28 may be mounted on a shaft 29 operable by means such as a handle 30. The shaft 29 is rotatably mounted in the wall of the master cylinder 13 to project into the free space between the master cylinder heads, and more particularly to support the locking member 28 between the piston head 17 and the stop 27. In one position, the locking member 28 permits free movement of the master cylinder. However, when the master cylinder has attained the hydraulic system locking position thereof as shown in Figure 2, the locking member 28 may be turned into locking position relative to the stop 27 to thereby hold the master piston against return movement until the locking member is released.

By way of example, in one utilitarian adaptation of the present invention, the supporting structure or body 5 may comprise part of the landing gear of a helicopter or similar aircraft adapted for vertical landing with the plungers 7 comprising landing stilts or leg shafts carrying landing wheels at their ends. The lifting power of the helicopter airfoils maintains the supporting structure body 5 in the preferred attitude relative to the surface S upon which the landing is to be made, irrespective of its contour. In the descent of the aircraft, the plunger legs 7 automatically assume the compensated relationship to the possibly irregular surface S on contact, in the manner described hereinabove, with the body structure 5 maintained continuously in the preferred attitude, such as horizontal or at any tilted convenient angle. Then as the weight of the aircraft settles down in balanced relationship onto the plunger legs 7 and pressure develops in the larger cylinder portion 20, the larger master piston end 17 drives the master piston into blocking relation to the hydraulic passage ports 19. As a result, during continuance of the imposition of the weight of the aircraft upon the body structure 5 a locked condition of the hydraulic system is maintained and which persists even though after the locked condition has been attained, there may be substantial shift of weight in the aircraft.

The same principles of operation prevail in other adaptations of the invention as for example in gun carriages, portable platforms, and the like where weight is imposed upon the device substantially from above and with the plunger legs 7 depending into engagement with a supporting surface. Until the full balanced weight of the supported structure is imposed upon the body structure 5, free compensating self-adjustment of the leg projections 7 is permitted and until equalized engagement has been attained, whereupon continued imposition of weight toward the plunger legs 7 results in the hydraulic locking described, and shifting of weight from a balanced to an unbalanced relation during the continuance of the imposition of the weight will not have any further adjusting effect.

Where the invention is applied to a supporting cradle such as in a drydock the plungers 7 may project upwardly from the bottom of the drydock as shoring arms to receive the bottom of the ship's hull by settling of the ship down upon the upwardly projecting ends of the plunger arms as the drydock is elevated or the water is pumped out of the drydock basin. After the upstanding plunger arms 7 have relatively adjusted themselves to the engaged contours of the ship's hull further balanced weight imposition against the plunger arms 7 causes the differential diameter master piston 14 to shift into its hydraulic system locking position wherein the plunger arms 7 will be maintained in the particular positions of adjustment attained until the load is backed off of the plunger arms.

Where the plunger arms 7 are disposed for engaging the sides of a ship or other object, means may be provided for moving the body structure 5 toward the object to be supported until the plunger arms 7 have made adjusted uniform contact with the object and balanced coincident relative opposing thrust load between the supporting structure 5 and the plunger arms 7 causes the master piston 14 to shift into its hydraulic system locking position.

From the foregoing it will be apparent that the present invention provides an automatic compensating device that may readily be adapted for a large variety of uses. The device is highly versatile both as to the number and kind of relatively movable actuating members it may have, and as to the direction of operation of the operating members. It will be obvious, of course, that instead of straight reciprocal and directly supporting plungers, piston actuated levers may be provided. That is, the operating pistons may be connected to levers through which pressure is transmitted to the pistons in operation. In any such adaptation, however, the principles of operation of the hydraulic system of the invention will be substantially the same.

Whatever the specific use to which the device of the instant invention may be put, it will be apparent that the load-responsively movable members 7 will maintain a spaced relation between the supporting structure 5 and the contours or surface areas against which the members 7 thrust, whether the supporting member 5 relies upon the members 7 as legs to support the same above the contours or areas or whether the supporting member 5 is a base structure such as a fixture with the members 7 projecting upwardly or laterally for receiving and supporting or at least thrusting there-against of a member or members to be thereby held in a preferred attitude spaced from and related to the supporting member 5.

Once the opposed thrust load or pressure has been established between the supporting structure 5 and all of the load-responsively movable member 7 and locking of the system occurs, the opposing thrust or load may vary or shift with respect to any of the load-responsive members 7 or the supporting member 5 without unbalancing the system or unlocking the same, and readjustment of the thrust responsive members 7 will occur only when there is a negative pressure or thrust relieving load condition, that is, where there is a reversal of the opposed loading of the supporting member and any one or more of the thrust members 7. This may occur, for example, where the means or area that imposes thrust load toward the supporting structure 5 upon any one or more of the members 7 backs off so as to relieve the compression force within the cylinder 9 of such member so as to relieve pressure in the chamber 12 and thus cause the master piston 14 to back off from its hydraulic locking relation to the compensating ports 19. However, immediately upon reestablishment of an opposing pressure condition between all of the load-responsive members 7 and the supporting structure 5, the locked condition of the system will be reestablished.

It will be understood that modifications and variations may be effected without departing from the scope of the novel concepts of the present invention.

I claim as my invention:

1. In an automatically compensating device, a supporting structure carrying a master cylinder with a master piston reciprocable therein and a plurality of working cylinders with respective reciprocable working pistons therein, said master cylinder and said master piston having aligned coacting large and small diameter portions, respective engagement members operatively connected to said working pistons and functioning by engagement with an opposing body to maintain said supporting structure in spaced relation to the body, respective hydraulic ducts connecting said working cylinders in equalizing relation with and through said small diameter portion of the master cylinder through normally open ports located to be blocked by the small diameter master piston portion on movement thereof in one direction, a hydraulic passage connecting said small and large diameter master cylinder portions, and hydraulic fluid substantially filling the system provided by said cylinders and ducts and passage, relative opposing thrust by the supporting structure and the opposing body causing said working members to drive said working pistons to move hydraulic fluid through said ducts and said small diameter master cylinder portion for relative adjustment until an equalized pressure condition occurs and hydraulic fluid pressure displacement through said connecting passage from the small diameter master cylinder portion to the large diameter master cylinder portion actuates said large diameter master piston portion due to effective pressure area differential of the master piston portions to move the small diameter master piston portion into blocking relation to said ports and thereby lock said ducts against relative fluid displacement through said small diameter master cylinder portion, thus holding said working pistons and said working members locked relative to the supporting structure to hold the supporting structure and said opposing body in a fixed spaced relation during continuance of said opposing thrust.

2. Automatic compensating device as defined in claim 1, wherein biasing means within the master cylinder acts upon the master piston automatically to shift the master piston out of port blocking relation of the small diameter portion thereof in the absence of said opposing thrust.

3. Automatic compensating device as defined in claim 1, including releasable means carried by the master cylinder and operative from outside of the same for selectively locking the master piston in its port-blocking relation in the master cylinder even though said opposing thrust is discontinued.

4. In an automatically compensating device as in claim 1, an air pressure booster chamber on said supporting means in communication with said small diameter cylinder portion to assist in shifting said master cylinder from blocking relation of said ports by said small diameter master piston portion when said opposing thrust is discontinued.

5. In an automatically compensating device as in claim 1, a biasing spring in said small diameter cylinder portion normally acting to bias said master piston away from said ports, an air pressure booster chamber communicating with said small diameter cylinder portion to assist the biasing action of the spring, and a releasable holding lock in said large diameter cylinder portion for selectively holding the master piston against moving away from said ports when said small diameter piston portion is in blocking relation thereto as aforesaid.

References Cited in the file of this patent

UNITED STATES PATENTS

| | | |
|---|---|---|
| 467,811 | Humphreys | Jan. 26, 1892 |
| 2,328,849 | Schoelm | Sept. 7, 1943 |
| 2,381,425 | Deal et al. | Aug. 7, 1945 |
| 2,510,285 | Heyerman | June 6, 1950 |
| 2,650,107 | Monnig | Aug. 25, 1953 |

FOREIGN PATENTS

| | | |
|---|---|---|
| 394,848 | Great Britain | July 6, 1933 |